US008364405B2

(12) United States Patent
Sprock et al.

(10) Patent No.: US 8,364,405 B2
(45) Date of Patent: Jan. 29, 2013

(54) SURFACE MAPPING SYSTEM AND METHOD

(75) Inventors: Christopher M. Sprock, Peoria, IL (US); Benjamin J. Hodel, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 475 days.

(21) Appl. No.: 12/641,889

(22) Filed: Dec. 18, 2009

(65) Prior Publication Data

US 2011/0153214 A1 Jun. 23, 2011

(51) Int. Cl.
*G06F 19/00* (2011.01)
*G06T 15/00* (2011.01)
(52) U.S. Cl. ............................. 702/5; 345/419
(58) Field of Classification Search ...... 702/5; 345/419; 701/2
See application file for complete search history.

(56) References Cited

U.S. PATENT DOCUMENTS

| | | | |
|---|---|---|---|
| 5,471,391 A | 11/1995 | Gudat et al. | |
| 5,493,494 A | 2/1996 | Henderson | |
| 5,817,936 A | 10/1998 | Schricker | |
| 5,946,813 A | 9/1999 | Nachbauer et al. | |
| 6,195,610 B1 | 2/2001 | Kaneko | |
| 6,198,431 B1 | 3/2001 | Gibson | |
| 6,435,018 B1 | 8/2002 | Murakami et al. | |
| 6,460,006 B1 | 10/2002 | Corcoran | |
| 6,847,887 B1 | 1/2005 | Casino | |
| 7,139,651 B2 | 11/2006 | Knowlton et al. | |
| 7,415,395 B2 | 8/2008 | Khan | |
| 7,483,808 B2 | 1/2009 | Greiner et al. | |
| 7,532,960 B2 | 5/2009 | Kumar | |
| 2004/0122580 A1 | 6/2004 | Sorrells | |
| 2004/0138799 A1 | 7/2004 | Makela et al. | |
| 2007/0078579 A1 | 4/2007 | Schricker et al. | |
| 2007/0255471 A1 | 11/2007 | Wallis et al. | |
| 2008/0063473 A1 | 3/2008 | Congdon et al. | |
| 2008/0082347 A1 | 4/2008 | Villalobos et al. | |
| 2008/0208393 A1 | 8/2008 | Schricker | |
| 2008/0208415 A1 | 8/2008 | Vik | |
| 2008/0243381 A1 | 10/2008 | Villalobos et al. | |
| 2009/0063031 A1 | 3/2009 | Greiner et al. | |
| 2009/0063226 A1 | 3/2009 | Greiner et al. | |
| 2009/0256860 A1* | 10/2009 | Nichols | 345/632 |
| 2010/0106344 A1* | 4/2010 | Edwards et al. | 701/2 |

* cited by examiner

*Primary Examiner* — Bryan Bui
(74) *Attorney, Agent, or Firm* — Derel Monteith

(57) ABSTRACT

A surface mapping system including a controller configured with a plurality of instructions, the plurality of instructions including instructions to receive position data from each machine in a plurality of machines located on a worksite and to generate, utilizing the received position data, a display signal for providing a visual depiction of a surface of the worksite.

19 Claims, 5 Drawing Sheets

SURFACE MAPPING SYSTEM AND METHOD

TECHNICAL FIELD

A surface mapping system and method is disclosed. The system and method enables mapping of worksite surfaces such as haul roads by traversing such surfaces with earthmoving machines having onboard global positioning functionality.

BACKGROUND

Physical worksite designs play an important role in worksite efficiency. Machine operation and performance on worksites play an equally important role. Suboptimal worksite design and suboptimal machine operation and performance on worksites can cause increased work cycle time, waste of machine fuel, accelerated wear of machine parts, accelerated deterioration of worksite conditions, and other problems. Systems for visualizing and analyzing worksites and machine operation and performance on the worksites are useful tools for helping to reduce the frequency and severity of such problems.

U.S. Pat. No. 5,493,494 to Henderson discloses a method and apparatus for operating compacting machinery relative to a work site. The system in Henderson utilizes a global positioning system (GPS) receiver on a compactor to generate two-dimensional or three-dimensional maps of a site being compacted. The maps are then altered as the compactor makes multiple compaction passes over the site until the desired number of passes or the desired site elevation has been reached.

SUMMARY

A surface mapping system is disclosed that includes a controller configured with a plurality of instructions, the plurality of instructions including instructions to receive position data from each machine in a plurality of machines located on a worksite and to generate, utilizing the received position data, a display signal for providing a visual depiction of a surface of the worksite.

A surface mapping system is disclosed that includes a controller configured with a plurality of instructions, the plurality of instructions including instructions to receive position data from each machine in a plurality of machines located on a worksite, the position data including a plurality of discrete points. The plurality of instructions further includes instructions to generate, utilizing the received position data, a display signal for providing a visual depiction of a surface of the worksite. Generating the display signal includes removing outlying points from the plurality of discrete points in the position data and generating a grid from non-outlying points in the plurality of discrete points. The surface mapping system further includes a display configured to receive the display signal and to display the visual depiction of the surface of the worksite.

A method for mapping a surface is disclosed. The method includes providing a controller and a display for receiving display signals from the controller. The method further includes receiving, in the controller, position data from each machine in a plurality of machines located on a worksite, the position data including a plurality of discrete points. The method further includes generating, in the controller, a display signal for providing a visual depiction of a surface of the worksite. Generating the display signal includes removing outlying points from the plurality of discrete points and generating a grid from non-outlying points in the plurality of discrete points. The method further includes displaying the visual depiction of the surface of the worksite on the display.

DETAILED DESCRIPTION

Figure 1:
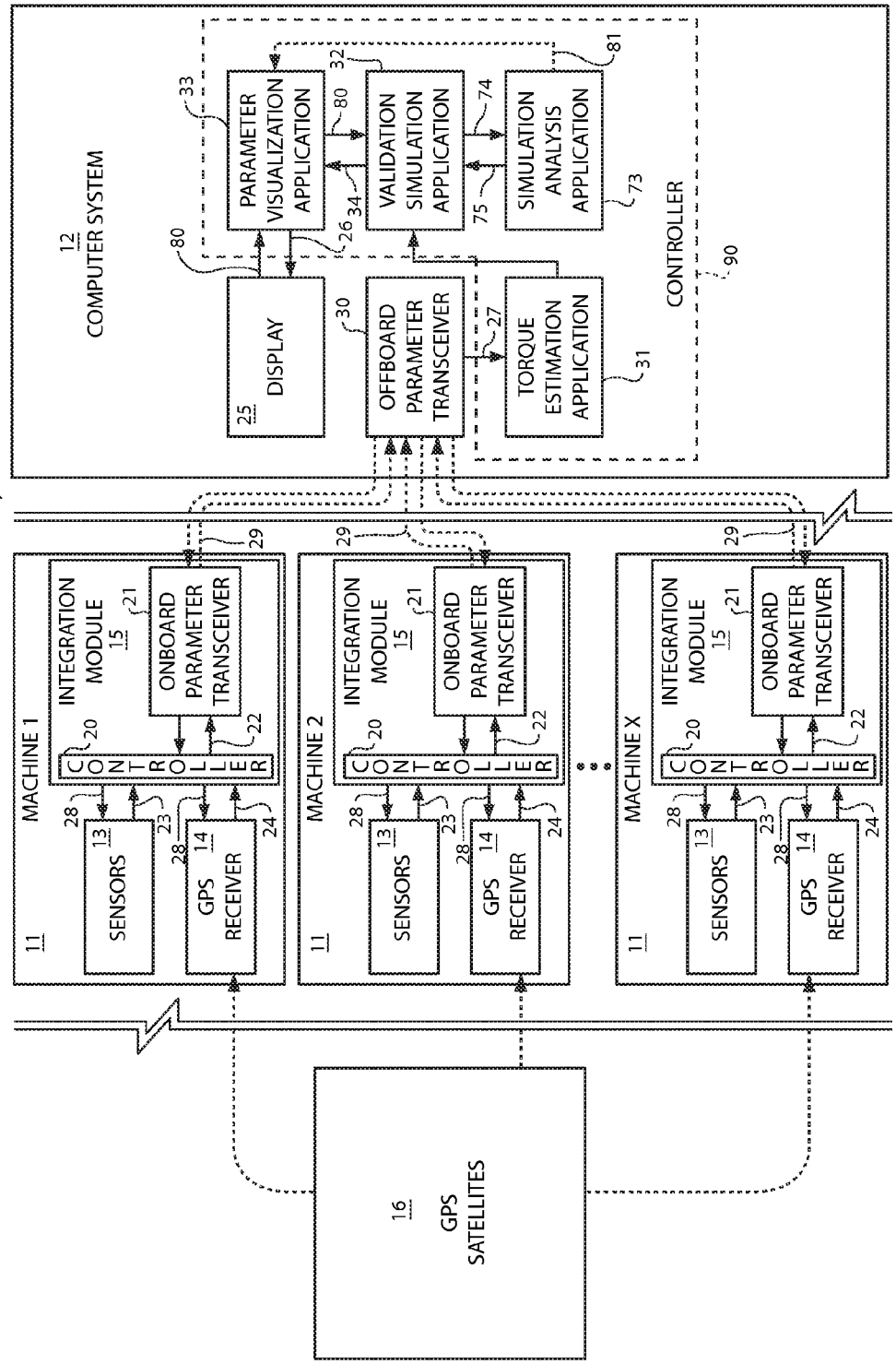
FIG. 1 is a schematic diagram of a parameter visualization system, an associated surface mapping system, and further associated systems and components according to an embodiment of the invention.

A parameter visualization system and a surface mapping system according to an embodiment of the invention is illustrated broadly in schematic diagram format at reference numeral 10 in FIG. 1. The parameter visualization and surface mapping system 10 includes a machine 11 and a computer system 12. As shown in FIG. 1, the parameter visualization and surface mapping system 10 may encompass multiple machines 11; however, for the sake of clarity and simplicity, except as expressly indicated otherwise, the parameter visualization and surface mapping system 10 will be hereinafter described relative to a single machine. Though the disclosed embodiment contemplates the computer system 12 being offboard the machine 11, the computer system 12 could alternatively be partially or wholly onboard the machine 11 without departing from the scope of the invention. The machine 11 may be any earthmoving machine configured to traverse a worksite, including but not limited to unpaved haul roads at a quarry, construction, or mine site. In this application, the term "earthmoving machine" includes any machine configured to dig, excavate, grade, drill, push, pull, rip, scrape, drag, carry, load, haul, and/or move geological, ecological, and/or archeological material such as, without limitation, earth, vegetation, rock, ore, coal, and/or buried objects, but excludes any machine provided with a compacting roller or similar implement configured primarily to compact such material. Though the machine 11 is illustrated as an off-highway truck, other examples of the machine 11 are, without limitation, underground mining trucks, articulated trucks, excavators, motor graders, wheel tractor scrapers, track-type tractors, wheel loaders, track loaders, backhoe loaders, skid steer loaders, multi-terrain loaders, telescoping material handlers, drills, and draglines.

The machine 11 includes a plurality of sensors 13, a global positioning system (GPS) receiver 14, and an integration module 15. The plurality of sensors 13 may include, by way of example and not by way of limitation, sensors in various systems of a motive engine such as an internal combustion engine or an electric motor, brake sensors, wheel sensors, pitch/roll/yaw sensors, fluid level sensors (fuel, oil, hydraulic fluid, etc.), hydraulic cylinder position sensors, truck bed position sensors, bucket/blade/implement position sensors, tire health sensors (pressure, temperature, tread, etc.), exhaust sensors (temperature, NOx, etc.), engine sensors (engine speed, engine load, fuel pressure, boost pressure, etc.), transmission sensors (gear, input/output speed, slip times, etc.), torque converter sensors (input speed, output speed, temperature, etc.), various other machine parameter sensors (payload, strut pressure, machine speed, etc.), and various operator cabin sensors (vibration, ignition key presence/position, seat position, seat belt position, door position, settings/positions of operator controls, etc.). The GPS receiver 14 is configured to receive signals from GPS satellites 16. The GPS receiver 14 may be low precision (e.g., update rate less than or equal to 1 Hz) or high precision (e.g., update rate greater than 1 Hz).

The integration module 15 includes a controller 20 and an onboard parameter transceiver 21. The onboard parameter transceiver 21 is configured to wirelessly propagate an output signal 22 received from the controller 20 of the integration module 15 to the computer system 12. As one of ordinary skill in the art would recognize, the term "controller" as used herein in connection with the integration module 15 and in connection with the computer system 12 means one or more microprocessors and, optionally, additional electronic hardware configured to communicate and/or otherwise function in conjunction with the one or more microprocessors. The controller 20 is configured with software for combining status signals 23 from the plurality of sensors 13 with position signals 24 from the GPS receiver 14 to generate the output signal 22 to be propagated by the onboard parameter transceiver 21. Specifically, the integration module 15 transmits simultaneous signals 28 to request one or more status signals 23 from the plurality of sensors 13 and a position signal 24 from the GPS receiver 14. The integration module 15 then receives the requested status signals 23 and position signals 24. The status signals 23 include parameter information comprising values of parameters. The parameters may include machine parameters and/or worksite parameters. Possible machine parameters include, without limitation, machine speed, fuel burn, throttle, engine speed, engine load, driveline torque, machine gear, payload, strut pressures, brake temperatures, and driveline temperatures. Possible worksite parameters include, without limitation, physical grade, rolling resistance, total effective grade, and profile (i.e., height). The position signals 24 include position information from which three-dimensional position data may be derived. In particular, the integration module 15 applies a geotransform file stored in the integration module 15 to the position information. The geotransform file includes local projection information that, when applied to raw GPS data in the position signals 24, places the raw GPS data within a three-dimensional coordinate system based on the local projection information. The three dimensions of the coordinate system are easting, northing, and height (see FIG. 3 and the associated discussion below).

The computer system 12 includes a display 25 and an offboard parameter transceiver 30 configured to receive wirelessly propagated signals 29 from the onboard parameter transceivers 21 on the machines 11. The computer system 12 also includes a controller 90 configured to run a plurality of software applications. As one of ordinary skill in the art would recognize, the computer system 12 of the disclosed embodiment may include one or more personal computers (handheld, laptop, and/or desktop) and/or one or more servers and may include remote computers accessed over a network (i.e., LAN, WLAN, WAN, WWAN, the Internet, etc.).

The parameter visualization and surface mapping system 10 further includes a torque sensor for measuring or estimating the torque generated by the machine 11. The torque sensor may either be a physical torque sensor (not shown) onboard the machine 11 or a virtual torque sensor onboard or offboard the machine 11. The physical torque sensor may be any mechanism known to those of ordinary skill in the art capable of measuring physical torque on a component (not shown) of the machine 11, for instance a strain gauge (not shown) on a drive axle (not shown) of the machine 11. The strain gauge or other physical torque sensor would be one of the plurality of sensors 13 on the machine 11. The virtual torque sensor may be one of the plurality of software applications configured to run on the controller 90 of the computer system 12, namely a torque estimation application 31. The torque estimation application 31 receives parameter information 27 from the offboard parameter transceiver 30 and processes the parameter information 27 to provide an estimate of the torque generated by the machine 11. The torque estimation application 31 may include a method disclosed in commonly owned U.S. Patent Application Publication No. US 2007/0255471 A1 published on Nov. 1, 2007 and entitled "TORQUE ESTIMATOR FOR A MACHINE" ("the '471 publication") or any other torque estimation method known to those of ordinary skill in the art. By way of example and not by way of limitation, as disclosed in the '471 publication, the torque estimation application 31 may utilize the parameter information 27 to generate histograms and estimates of parameter values for parameters such as pinion torque and torque converter output torque and may utilize such parameter values to detect and/or predict component failure or damage caused by excessive torque.

The plurality of software applications configured to run on the controller 90 of the computer system 12 may further include a validation simulation application 32 and a parameter visualization application 33. The validation simulation application 32 may include a method disclosed in commonly owned U.S. Pat. No. 7,415,395 B2 issued on Aug. 19, 2008 and entitled "SYMBOLIC EVALUATION ENGINE FOR HIGH-PERFORMANCE SIMULATIONS" ("the '395 patent") or any other validation simulation method known to those of ordinary skill in the art. By way of example and not by way of limitation, as disclosed in the '395 patent, the validation simulation application 32 may practice a method that includes (1) building equation terms, (2) defining and symbolically solving component equations and connectivity equations in conjunction with user-defined boundary conditions, and (3) using the solutions as systems for processing initial conditions and transients to perform simulations.

Figure 2:
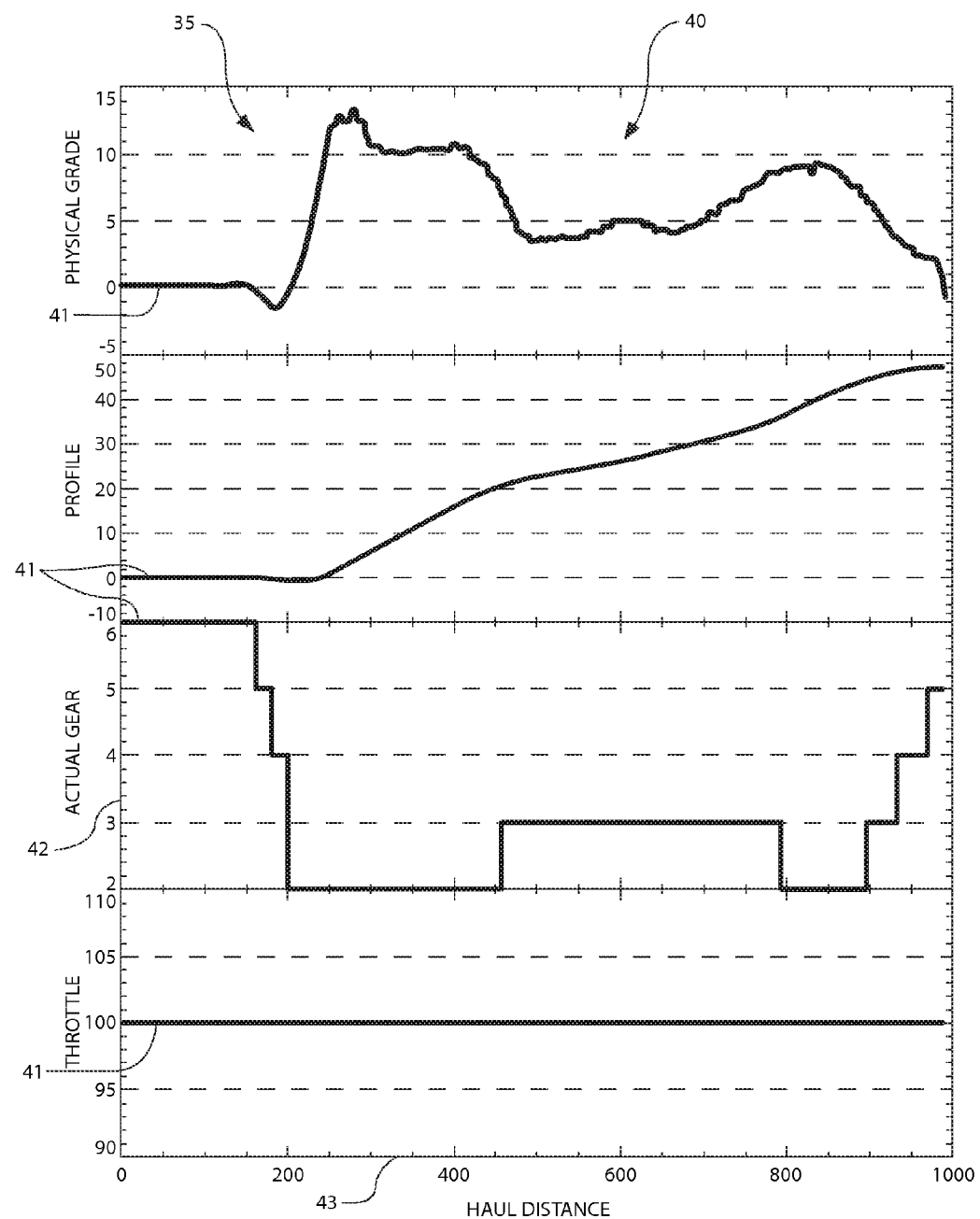
FIG. 2 is a graph generated by an embodiment of the parameter visualization and surface mapping systems, the graph including a two-dimensional plot of multiple parameters along a common horizontal axis.

The parameter visualization application 33 receives an input signal 34 from the validation simulation application 32 that includes values of one or more preselected machine parameters as measured at one or more preselected points or periods in time and/or at one or more preselected locations. As discussed further below, upon request from the user the parameter visualization application 33 then generates and transmits one or more display signals 26 to the display 25 to render, as desired, two-, three- and/or four-dimensional (2D, 3D and/or 4D) visual representations of the input signal 34 on a graphical user interface (GUI) 35. Turning now to FIG. 2, the GUI 35 displays a 2D representation 40 including a plurality of lines 41 on a Cartesian graph, each line 41 representing the varying value of a preselected machine or worksite parameter along a "y" or vertical axis 42 as a function of a single scale of time or distance along an "x" or horizontal axis 43. Thus, in the 2D representation 40, the lines 41 share a common parameter and a common scale along the "x" axis 43 while each having a different, preselected parameter and scale along the "y" axis 42.

Figure 3:
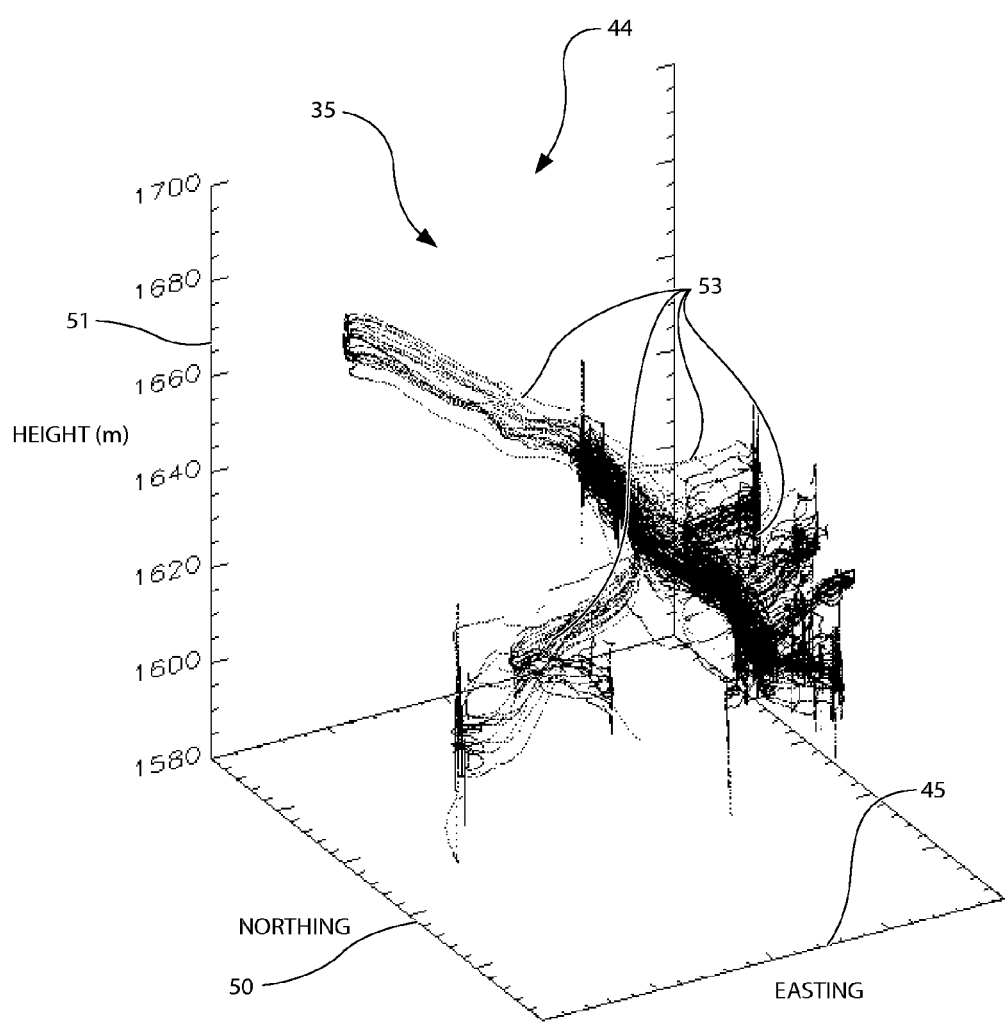
FIG. 3 is a three-dimensional plot of position data generated by an embodiment of the parameter visualization and surface mapping systems.

In FIG. 3, the GUI 35 displays a raw 3D representation 44 including three axes 45, 50, 51 oriented to define a visual depiction of a worksite. The three axes 45, 50, 51 include first and second axes 45, 50 in perpendicular and coplanar relation to one another and a third axis 51 in perpendicular and coplanar relation to the first axis 45. As known to those of ordinary skill in the art, the first and second axes 45, 50 are the "x" and "y" axes and the third axis 51 is a substantially vertical "z" axis. In the visual depiction, the first and second axes 45, 50 represent different compass directions within a plane "P" they define. For instance, the first or "x" axis 45 could represent due north or due south while the second or "y" axis 50 represents due east or due west and taken together the first and second axes 45, 50 could define the plane "P" to be substantially aligned with or substantially parallel to a plane (not shown) defined on the worksite by the most prominent level of the ground (not shown) relative to the horizon (not shown). However, the first and second axes 45, 50 could alternatively represent any perpendicular, coplanar directions selected by a user, regardless of whether the directions align with due north, south, east, or west. In any event, the third axis 51 represents the degree of elevation above the plane "P" defined by the first and second axes 45, 50. In the specific embodiment illustrated in FIG. 3, the first and second axes 45, 50 represent east and north, respectively ("easting" and "northing"), while the third axis 51 is height. Though FIG. 3 only shows units for height (meters), the units for easting and northing are also meters; the specific unit measurements for easting and northing have been removed in order to enhance the overall readability of the drawing.

The latitudinal and longitudinal coordinates of the worksite represented by the raw 3D representation 44 may be selected by the user, for instance by enabling the user to select the coordinates of the point at which the first and second axes 45, 50 intersect, which may, as desired, be the origin, i.e., the point with (0, 0) coordinates at which the scales of the axes 45, 50 begin, or another predetermined point along one of the three axes 45, 50, 51. Further, the scales of the three axes 45, 50, 51 may be selected by the user, thereby enabling visual depictions of worksites of widely varying sizes.

In the raw 3D representation 44, the visual depiction of the worksite is comprised of a plurality of discrete points 53 plotted relative to the three axes 45, 50, 51. Each of the discrete points 53 represents a three-dimensional position indicated by the three-dimensional position data generated by the integration module 15 of the machine 11, as discussed above. As more three-dimensional position data is plotted as discrete points 53 relative to the three axes 45, 50, 51 in the visual depiction of the selected geographic area, the visual depiction of the selected geographic area becomes increasingly more defined and accurate.

One or more of a plurality of methods may be utilized to gather and process the three-dimensional position data represented by the plurality of discrete points 53 on the visual depiction of the worksite. For instance, the plurality of machines 11 may be mobile machines provided on the worksite. As shown in FIG. 1, each machine in the plurality of mobile machines 11 is configured as described above. The GPS receivers 14 on the mobile machines 11 may be low-precision GPS receivers. By way of example and not by way of limitation, each of the low-precision GPS receivers may be set to an update rate of approximately 1 Hz. The mobile machines 11 then traverse the worksite while the GPS receivers 14 generate the position signals 24, which in turn are processed as described above to generate three-dimensional position data for use in the visual depiction of the worksite. The controller 90 of the computer system 12 may optionally further process the three-dimensional position data, for instance to subtract or otherwise take into account the distances between the GPS receivers 14 and the worksite surfaces being traversed by the mobile machines 11. But in any event, for each location indicated in the three-dimensional position data, one of the plurality of discrete points 53 is generated and plotted on the visual depiction of the worksite.

The plurality of discrete points 53 may be automatically added to the visual depiction in real time as the plurality of mobile machines 11 traverses the worksite. Alternatively or in addition, the plurality of discrete points 53 may be automatically added to the visual depiction after time delays caused by processing latency and/or after preprogrammed time delays. Such preprogrammed time delays may, for example, provide time for the position information being processed to be compared to position information obtained from other sources such as additional GPS receivers (not shown) and corrected as necessary in accordance with preprogrammed algorithms. Still further, some or all of the plurality of discrete points 53 may be added to the visual depiction only upon user demand rather than in automatic fashion.

Figure 4:
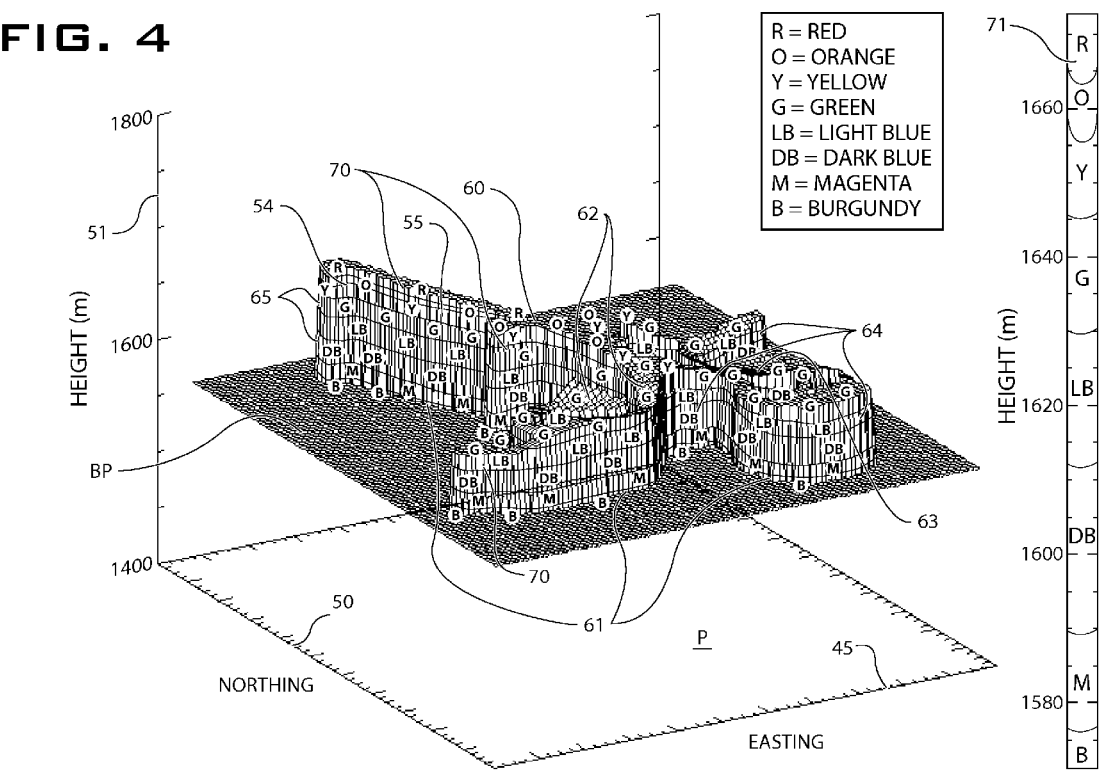
FIG. 4 is a four-dimensional plot of position data and parameter information generated by an embodiment of the parameter visualization and surface mapping systems.

Turning now to FIG. 4, the GUI 35 displays a processed 3D representation 54 in conjunction with a 4D representation 55. The processed 3D representation 54 includes a top surface 60 generated from the plurality of discrete points 53 (FIG. 3) shown in the raw 3D representation 44 (FIG. 3). The top surface 60 is generated by applying one or more outlier removal methods to identify and remove outlying points within the plurality of discrete points 53 and then applying one or more gridding methods to generate a grid from the non-outlying points, i.e., the points remaining after the outlying points have been removed.

Among the outlier removal methods that may be used are a cell count method, a nearest neighbor method, a proximity count method, and a kD tree method. Additional or alternative outlier removal methods known to those of ordinary skill in the art may also be used. In the cell count method, a three-dimensional space defined by the plurality of discrete points 53 is divided into a plurality of volumetric units such as equally-sized cubes, and if a given volumetric unit does not encompass a preselected minimum number of discrete points, the unit is removed from the analysis. In the nearest neighbor method, individual points in the plurality of discrete points 53 that are beyond a preselected distance from any other discrete points are removed from the analysis.

In the proximity count method, the user employs GPS units to select minimum and maximum range boundaries for the "x", "y", and "z" axes, thereby specifying the size of a three-dimensional form (cube or rectangular prism) that will scan across the plurality of discrete points 53. The user also selects a count threshold, i.e., the minimum number of points that must appear in the three-dimensional form in order to avoid a determination that the point(s) being scanned are outliers. The user then instructs the controller 90 to begin the scan in accordance with the preselected x-y-z boundaries and the preselected count threshold. As the scan progresses, the controller 90 indexes the points being scanned. The controller 90 rejects the points that do not appear in the three-dimensional form with a number of points equal to or greater than the count threshold. Further, the controller 90 flags the points that do appear in the three-dimensional form with a number of points equal to or greater than the count threshold. As the three-dimensional form scans through the plurality of discrete points 53, the previously rejected or flagged points are not re-analyzed, thereby expediting processing. The scan further expedites processing by proceeding temporally and spatially. Specifically, the placement of the three-dimensional form among the plurality of discrete points 53 is determined in accordance with the order the points were created in time. But after the three-dimensional form is placed, all points falling within the preselected x-y-z boundaries of the three-dimensional form are analyzed, regardless of when such points were created.

As one of ordinary skill in the art would recognize, in the kD tree method the overall three-dimensional space defined by the plurality of discrete points 53 generates a splitting plane that divides the overall space into two subspaces. Each of the two subspaces then generates a splitting plane dividing each of the two subspaces into two further subspaces. This process continues until each subspace is a leaf node, i.e., a subspace that, according to preprogrammed instructions, does not need to be split into two subspaces. After all subspaces are leaf nodes, any one of a number of analysis methods may be applied to the points within each leaf node. For instance, the above-described cell count method and/or nearest neighbor method may be applied to each leaf node to remove outliers.

After one or more of the above-described outlier removal methods are utilized, one or more gridding methods are applied to the non-outlying points to smooth the points as necessary to generate the grid that forms the top surface 60. For instance, a polygonal mesh may be overlaid onto the space defined by the non-outlying points and the points within each polygon may be averaged to arrive at the x-y-z coordinates of the top surface 60. Additionally, the polygons that house the non-outlying points may be weighted manually and/or automatically and averaging may be repeated. The weighting and averaging process may be repeated multiple times until the top surface 60 meets with the expectations of one of ordinary skill in the art. Other gridding methods known to those of ordinary skill in the art may be additionally or alternatively employed.

The resulting top surface 60 is utilized to generate three-dimensional forms 61. Specifically, the representations 54, 55 may include a first plurality of line segments 62 that connect points 63 included in the top surface 60 to one another and/or a second plurality of line segments 64 that connect some or all of the surface points 63 to the plane "P" defined by the first and second axes 45, 50 or, as shown, to a base plane "BP" generated in substantially parallel relation to the plane "P". The pluralities of line segments 62, 64 connecting the surface points 63 to one another and/or to the base plane "BP" defined by the first and second axes 45, 50 define the three-dimensional forms 61 in the visual depiction of the worksite.

Continuing to look at FIG. 4, in the 4D representation 55 the fourth dimension of the visual depiction is obtained by providing visual indicia of parameter value magnitude 65. The ranges of parameter values between the top surface 60 and the predetermined plane "P" or the base plane "BP" are extrapolated and represented as side surfaces 70 of the three-dimensional forms 61 of the processed 3D representation 54. The visual indicia of parameter value magnitude 65 may represent values of spatial and/or non-spatial parameters and may include one or more types of visual indicia such as multiple colors, shades of a single color, types of cross-hatching, contour lines, and/or other indicia that vary as the underlying parameter values vary. In the illustrated embodiment, the visual indicia 65 are multiple colors along the color spectrum of visible light (i.e., red through violet or a subset thereof). The visual indicia 65 are keyed to a certain range of parameter values. A key 71 illustrating the parameter value range represented by the colors of the visual indicia 65 may accompany the visual depiction of the worksite. Without departing from the scope of the invention, rather than being continuous (as the color spectrum), the visual indicia 65 may be graduated and may represent any number of discrete parameter values. Thus, the visual indicia of parameter value magnitude 65 may be employed to represent a single parameter value, the on/off values of a binary parameter, and/or multiple values of a parameter along a graduated (digital) or continuous (analog) scale. Though the illustrated visual indicia 65 indicate the height of the top surface 60, the visual indicia 65 could alternatively indicate the values of any machine or worksite parameter selected by a user.

Figure 5:
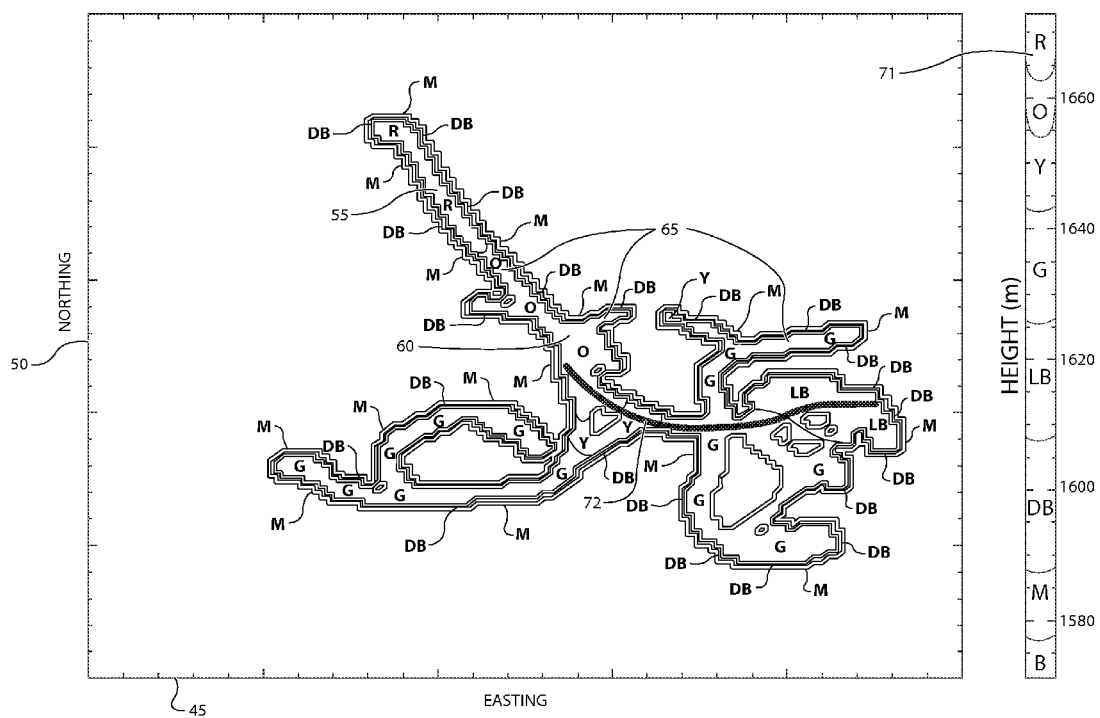
FIG. 5 is a top plan view of the plot shown in FIG. 4.

Turning now to FIG. 5, a two-dimensional top plan view of the 4D representation 55 is shown. The plan view includes the first and second axes 45, 50 included in the raw 3D representation 44, the processed 3D representation 54, and the 4D representation 55 as well as the key 71 of the 4D representation 55. The top surface 60 is depicted in relation to the first and second axes 45, 50. In particular, the visual indicia 65 associated with the top surface 60 of the three-dimensional form 61 are depicted such that the parameter value magnitudes indicated by the visual indicia 65 may be quickly discerned. In addition, in FIG. 5 an indicator line 72 is shown that designates a portion of the top surface 60 that corresponds to the distance used as the "x" axis 43 in the 2D representation 40 shown in FIG. 2. However, in the particular illustrations provided in FIGS. 2 and 5, the directions are reversed. More specifically, the distance on the "x" axis 43 in FIG. 2 runs left to right while the corresponding distance represented by the indicator line 72 in FIG. 5 runs right to left.

The controller 90 of the computer system 12 may optionally be further configured with a simulation analysis software application 73 (FIG. 1). The torque estimation application 31, the validation simulation application 32, the parameter visualization application 33, and the simulation analysis application 73 may be provided as a single, fully integrated software application or as a plurality of software applications configured to communicate with one another within the controller 90 in accordance with any embodiment of the method of the invention, including but not limited to the embodiments disclosed herein. The simulation analysis application 73 may include an artificial intelligence engine (AIE; not shown) initially programmed with analytical algorithms (for example, expert systems, neural networks, mathematical models, and/or fuzzy logic) derived from human experience and know-how regarding, for instance, the causal and correlational relationships among parameters and validation results and/or the acceptability of validation results. The AIE may then receive validation simulation results 74 from the validation simulation application 32 and apply the analytical algorithms to the validation simulation results 74 to determine whether the validation simulation results 74 are acceptable. If the validation simulation results 74 are determined by the AIE to be unacceptable, the AIE may apply the analytical algorithms to alter the parameters being validated, submit the altered parameters 75 to the validation simulation application 32, and again receive the validation simulation results 74 and apply the analytical algorithms to the validation simulation results 74 to determine whether the validation simulation results 74 based on the altered parameters 75 are acceptable. This cycle may be repeated as necessary until the validation simulation results 74 are determined by the AIE to be acceptable, at which time the AIE may send accepted validation simulation results 81 to the parameter visualization application 33 for display. In addition, the AIE may be adaptive. As such, the AIE may analyze the validation simulation results 74 to alter or add to the analytical algorithms applied during future analyses of the validation simulation results 74.

INDUSTRIAL APPLICABILITY

The parameter visualization and surface mapping system 10 may be utilized to map, analyze, and design modifications of worksites, for instance haul roads at a mine site. As described above, haul roads may be mapped at a mine site by utilizing GPS data generated on machines such as off-highway trucks that frequently traverse such haul roads. In addition, values of machine parameters may be correlated with certain locations on the map. Using the 2D representation 40 (FIG. 2) provided by the parameter visualization application 33 (FIG. 1), a user may identify instances of suboptimal machine performance and/or portions of a worksite that cause suboptimal machine performance. A user may then use an input device (not shown) in connection with the GUI 35 (FIG. 2) in order to modify the contours of one or more of the plurality of lines 41 (FIG. 2) to reflect desired values of the preselected machine parameters and/or worksite parameters.

For instance, among the plurality of lines 41 may be a first line representing values of a first parameter and a second line representing values of a second parameter. The values of the second parameter may have a causal or correlational relationship with the values of the first parameter such that modifications of the values of the first parameter result in modifications of the values of the second parameter. The first and second lines may result from a first display signal 26 generated by the controller 90 of the computer system 12 and transmitted by the controller 90 to the display 25. The user may determine, based on the lines 41 on the GUI 35, that the values of the first parameter are suboptimal and need modification. Using the input device, the user may then select one or more portions of the first line on the GUI 35, move the selected portions of the first line into one or more desired positions or contours, deselect the selected portions, and repeat the process as necessary with various portions of the first line. The modified parameter information 80 represented by the modifications to the first line may then be processed by the parameter visualization application 33 and the validation simulation application 32 to generate modified values of the second parameter and a modified version of the second line reflecting the modified values. If the values of the first and/or second parameters are still suboptimal, the first or second lines in the 2D representation may be remodified and reprocessed by the validation simulation application 32 as necessary to achieve desired parameter values. If desired, multiple lines 41 representing multiple interdependent parameters may be modified to reflect desired parameter values before the effects of the modifications on additional parameters are simulated and visualized. As discussed above, the computer system 12 may also be utilized, upon user demand, to generate and display the raw 3D, processed 3D, and/or 4D representations of the values of the first and/or second parameters. Specifically, the raw 3D, processed 3D, and/or 4D representations may result from a second display signal 26 generated by the controller 90 of the computer system 12 and transmitted by the controller 90 to the display 25.

The desired parameter values input by the user and/or calculated by the controller 90 of the computer system 12 may then be implemented by physically altering the worksite in accordance with desired worksite parameters and/or changing machine operation in accordance with desired machine parameters. For instance, in order to reduce the amount of fuel burned by a machine at a particular location on the worksite, a physical grade of the worksite may be changed and/or a machine operator may be trained to change machine gears or adjust machine throttle at different times or magnitudes. In this way, the parameter visualization and surface mapping system 10 enables worksites and machines to be co-optimized in accordance with operation priorities.

A parameter visualization and surface mapping system is disclosed. Many aspects of the disclosed embodiments may be changed without departing from the scope of the invention, which is delineated only by the following claims.

What is claimed is:

1. A surface mapping system comprising:
   a sensor on each of a plurality of machines located on a worksite;
   a display for providing a visual depiction of a surface of the worksite;
   a controller configured to
      receive position data comprising a plurality of discrete points from the sensors on each of the plurality of machines;
   remove outlying points from the plurality of discrete points;
      generate visual depiction information of a surface of the worksite from non-outlying points; and
      transmit the visual depiction information to the display.

2. The surface mapping system of claim 1, wherein the visual depiction of the surface of the worksite is three-dimensional.

3. The surface mapping system of claim 1, wherein the visual depiction information further comprises a grid from non-outlying points in the plurality of discrete points.

4. The surface mapping system of claim 3, wherein the visual depiction information further comprises removing the outlying points from the plurality of discrete points by dividing a three-dimensional space defined by the plurality of discrete points into a plurality of volumetric units and determining which volumetric units in the plurality of volumetric units contain less than a preselected minimum number of discrete points, and omitting the discrete points contained in such volumetric units from the generation of the grid.

5. The surface mapping system of claim 3, wherein the visual depiction information further comprises removing the outlying points from the plurality of discrete points by determining which discrete points are beyond a preselected distance from any other discrete points and omitting such discrete points from the generation of the grid.

6. The surface mapping system of claim 3, wherein the visual depiction information further comprises removing the outlying points from the plurality of discrete points by scanning the plurality of discrete points with a three-dimensional form having preselected dimensions, determining which discrete points appear in the three-dimensional form with less than a preselected minimum number of discrete points, and omitting such discrete points from the generation of the grid.

7. The surface mapping system of claim 3, wherein the visual depiction information further comprises generating the grid from the non-outlying points by averaging values of adjacent points among the non-outlying points.

8. A method for mapping a surface, comprising:
   receiving position data from a sensor on each of a plurality of machines located on a worksite, the position data comprising a plurality of discrete points;
   generating visual depiction information of a surface of the worksite by removing outlying points from the plurality of discrete points and generating a grid from non-outlying points in the plurality of discrete points; and
   displaying the visual depiction information of the surface of the worksite on the display.

9. The method of claim 8, wherein the visual depiction information of the surface of the worksite is three-dimensional.

10. The method of claim 8, wherein said removing of the outlying points from the plurality of discrete points comprises dividing a three-dimensional space defined by the plurality of discrete points into a plurality of volumetric units, determining which volumetric units in the plurality of volumetric units contain less than a preselected minimum number of discrete points, and omitting the discrete points contained in such volumetric units from said generating of the grid.

11. The method of claim 8, wherein said removing of the outlying points from the plurality of discrete points comprises determining which discrete points are beyond a preselected distance from any other discrete points and omitting such discrete points from said generating of the grid.

12. The method of claim 8, wherein said removing of the outlying points from the plurality of discrete points comprises scanning the plurality of discrete points with a three-dimensional form having preselected dimensions, determining which discrete points appear in the three-dimensional form with less than a preselected minimum number of discrete points, and omitting such discrete points from said generating of the grid.

13. A controller for mapping a surface, the controller comprising:
    an input for receiving position data comprising a plurality of discrete points from a sensor on each machine in a plurality of machines located on a worksite;
    wherein the controller is configured to remove outlying points from the plurality of discrete points, generate visual depiction information of a surface of a the worksite from non-outlying points, and transmit the visual depiction information to a display.

14. The controller of claim 13, wherein the visual depiction of the surface of the worksite is three-dimensional.

15. The controller of claim 13, wherein the visual depiction information further comprises a grid from non-outlying points in the plurality of discrete points.

16. The controller of claim 15, wherein the visual depiction information further comprises removing the outlying points from the plurality of discrete points by dividing a three-dimensional space defined by the plurality of discrete points into a plurality of volumetric units and determining which volumetric units in the plurality of volumetric units contain less than a preselected minimum number of discrete points, and omitting the discrete points contained in such volumetric units from the generation of the grid.

17. The controller of claim 15, wherein the visual depiction information further comprises removing the outlying points from the plurality of discrete points by determining which discrete points are beyond a preselected distance from any other discrete points and omitting such discrete points from the generation of the grid.

18. The controller of claim 15, wherein the visual depiction information further comprises removing the outlying points from the plurality of discrete points by scanning the plurality of discrete points with a three-dimensional form having preselected dimensions, determining which discrete points appear in the three-dimensional form with less than a preselected minimum number of discrete points, and omitting such discrete points from the generation of the grid.

19. The controller of claim 15, wherein the visual depiction information further comprises generating the grid from the non-outlying points by averaging values of adjacent points among the non-outlying points.

* * * * *